(12) United States Patent
Ye (10) Patent No.: US 9,436,050 B2
(45) Date of Patent: Sep. 6, 2016

(54) METHOD OF PLANARIZING PROTRUSIONS ON AN ARRAY SUBSTRATE OF A LIQUID CRYSTAL PANEL

(71) Applicant: SHENZHEN CHINA STAR OPTOELECTRONICS TECHNOLOGY CO., LTD., Shenzhen, Guangdong (CN)

(72) Inventor: Yanxi Ye, Guangdong (CN)

(73) Assignee: SHENZHEN CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 43 days.

(21) Appl. No.: 14/416,534

(22) PCT Filed: Dec. 25, 2014

(86) PCT No.: PCT/CN2014/094905
§ 371 (c)(1),
(2) Date: Jan. 22, 2015

(87) PCT Pub. No.: WO2016/095251
PCT Pub. Date: Jun. 23, 2016

(65) Prior Publication Data
US 2016/0178953 A1    Jun. 23, 2016

(30) Foreign Application Priority Data

Dec. 19, 2014 (CN) .......................... 2014 1 0803262

(51) Int. Cl.
*G02F 1/1345* (2006.01)
*G02F 1/1362* (2006.01)
*G02F 1/1335* (2006.01)
*G02F 1/1337* (2006.01)
*G02F 1/1341* (2006.01)
*G02F 1/1333* (2006.01)

(52) U.S. Cl.
CPC ......... *G02F 1/13454* (2013.01); *G02F 1/1337* (2013.01); *G02F 1/1341* (2013.01); *G02F 1/1362* (2013.01); *G02F 1/133512* (2013.01); *G02F 1/133516* (2013.01); *G02F 2001/133357* (2013.01)

(58) Field of Classification Search
CPC ..................... G02F 1/13454; G02F 1/133512; G02F 1/362; G02F 1/1337; G02F 1/133516; G02F 1/1341
See application file for complete search history.

(56) References Cited

U.S. PATENT DOCUMENTS

2014/0333884 A1* 11/2014 Lee ....................... G02F 1/1339
349/153

* cited by examiner

*Primary Examiner* — Joseph L Williams
(74) *Attorney, Agent, or Firm* — Kirton McConkie; Evan R. Witt (57) ABSTRACT

A method of manufacturing the liquid crystal panel is provided, including: forming an array substrate; forming a color filter substrate; disposing a color planarizing layer on the color filter substrate, and disposing a notch on the color planarizing layer on the color filter substrate; fabricating a liquid crystal cell by using the array substrate and the color filter substrate, and filling liquid crystal molecules within the liquid crystal cell; and forming a on the array substrate in a first deformation region of the array substrate. The liquid crystal cell having non-uniform gaps is prevented.

15 Claims, 10 Drawing Sheets

METHOD OF PLANARIZING PROTRUSIONS ON AN ARRAY SUBSTRATE OF A LIQUID CRYSTAL PANEL

FIELD OF THE INVENTION

The present invention relates to a field of liquid crystal displays, and particularly to a method of manufacturing a liquid crystal panel.

BACKGROUND OF THE INVENTION

With the development on technologies and the emergence of smartphones and tablets, it put forward a high specification requirement for the medium or small size liquid crystal panels. One of aspects is the liquid crystal panel with a narrow frame.

Under the same display area, a non-display region on the edge of the liquid crystal panel can be decreased by using the narrow frame design, so that the liquid crystal panel has a small size. However, the design difficulty of the liquid crystal panel is large. For example, the space utilization of driver circuits should be increased. The frame outside a driver circuit side of the conventional middle-end and high-end liquid crystal panels is about 5 mm.

However, the frame on the driver circuit side is near an effective display area (AA area) of the liquid crystal panel, so that a substrate glass of the AA area expands by heat due to a partial temperature is too high when bonding the driver chips, so as to protrude toward an inner side of the liquid crystal panel. Thus, a gap of a liquid crystal cell on the region where expands by heat becomes smaller, and mura defects are generated.

Therefore, it is necessary to provide a method of manufacturing a liquid crystal panel to solve the above technical problems.

SUMMARY OF THE INVENTION

An object of the present invention is to provide a method of manufacturing a liquid crystal panel, where a liquid crystal cell having non-uniform gaps can be prevented, so as to solve the technical problem caused by a partial gaps of the liquid crystal cell becoming smaller, thereby generating mura defects when bonding driver chips in the conventional method of manufacturing the liquid crystal panel.

In order to solve the above-mentioned problem, the technical solution of the present invention is as follows:

The present invention provides a method for manufacturing a liquid crystal panel, comprising:

fabricating an array element on a first substrate base to form an array substrate;

disposing a first alignment layer on a display region of the array substrate;

fabricating a black matrix and a color resist on the second substrate base to form a color filter substrate;

disposing a color planarizing layer on the color filter substrate, and disposing a notch on the color planarizing layer in a second deformation region of the color filter substrate;

disposing a second alignment layer on the color planarizing layer of the color filter substrate;

fabricating a liquid crystal cell by using the array substrate and the color filter substrate, and filling liquid crystal molecules within the liquid crystal cell; and disposing a driver chip on a non-display region of the array substrate, and forming a protrusion on the array substrate in a first deformation region of the array substrate, wherein a position of the first deformation region of the array substrate corresponds to a position of the second deformation region of the color filter substrate; and a depth of the notch is generally same as a height of the protrusion.

In the method of manufacturing the liquid crystal panel of the present invention, after the step of fabricating an array element on a first substrate base to form an array substrate, further comprising:

disposing an array planarizing layer on the array substrate; and disposing the first alignment layer on the array planarizing layer of the display region of the array substrate.

In the method of manufacturing the liquid crystal panel of the present invention, the step of disposing a color planarizing layer on the color filter substrate, and disposing a notch on the color planarizing layer in a second deformation region of the color filter substrate further comprising:

disposing the color planarizing layer on the color filter substrate;

patterning the color planarizing layer by using a halftone mask, so that the notch of the color planarizing layer is formed on the second deformation region of the color filter substrate.

In the method of manufacturing the liquid crystal panel of the present invention, the step of disposing a color planarizing layer on the color filter substrate, and disposing a notch on the color planarizing layer in a second deformation region of the color filter substrate further comprising:

disposing the first color planarizing layer on the color filter substrate by using a pattern process, wherein the first color planarizing layer is not disposed on the second deformation region of the color filter substrate; and disposing the second color planarizing layer on the color filter substrate which is provided with the first color planarizing layer, so that the notch of the second color planarizing layer is formed on the second deformation region of the color filter substrate.

The present invention further provides a method for manufacturing a liquid crystal panel, comprising:

fabricating an array element on a first substrate base to form an array substrate;

fabricating a black matrix and a color resist on the second substrate base to form a color filter substrate;

disposing a color planarizing layer on the color filter substrate, and disposing a notch on the color planarizing layer in a second deformation region of the color filter substrate;

fabricating a liquid crystal cell by using the array substrate and the color filter substrate, and filling liquid crystal molecules within the liquid crystal cell; and disposing a driver chip on a non-display region of the array substrate, and forming a protrusion on the array substrate in a first deformation region of the array substrate, wherein a position of the first deformation region of the array substrate corresponds to a position of the second deformation region of the color filter substrate; and a depth of the notch is generally same as a height of the protrusion.

In the method of manufacturing the liquid crystal panel of the present invention, after the step of fabricating an array element on a first substrate base to form an array substrate, further comprising:

disposing a first alignment layer on a display region of the array substrate.

In the method of manufacturing the liquid crystal panel of the present invention, after the step of forming an array element on a first substrate base to form an array substrate, further comprising:

disposing an array planarizing layer on the array substrate; and disposing the first alignment layer on the array planarizing layer of the display region of the array substrate.

In the method of manufacturing the liquid crystal panel of the present invention, after the step of disposing a color planarizing layer on the color filter substrate, and disposing a notch on the color planarizing layer in a second deformation region of the color filter substrate, further comprising:

disposing a second alignment layer on the color planarizing layer of the color filter substrate.

In the method of manufacturing the liquid crystal panel of the present invention, the step of disposing a color planarizing layer on the color filter substrate, and disposing a notch on the color planarizing layer in a second deformation region of the color filter substrate further comprising:

disposing the color planarizing layer on the color filter substrate;

patterning the color planarizing layer by using a halftone mask, so that the notch of the color planarizing layer is formed on the second deformation region of the color filter substrate.

In the method of manufacturing the liquid crystal panel of the present invention, the step of disposing a color planarizing layer on the color filter substrate, and disposing a notch on the color planarizing layer in a second deformation region of the color filter substrate further comprising:

disposing the first color planarizing layer on the color filter substrate by using a pattern process, wherein the first color planarizing layer is not disposed on the second deformation region of the color filter substrate; and disposing the second color planarizing layer on the color filter substrate which is provided with the first color planarizing layer, so that the notch of the second color planarizing layer is formed on the second deformation region of the color filter substrate.

The present invention further provides a method for manufacturing a liquid crystal panel, comprising:

fabricating an display element on a first substrate base to form an array substrate;

disposing an array planarizing layer on the array substrate, and forming a notch on the array planarizing layer in the first deformation region of the array substrate by using a pattern process;

fabricating a black matrix and a color resist on the second substrate base to form a color filter substrate;

disposing a color planarizing layer on the color filter substrate;

fabricating a liquid crystal cell by using the array substrate and the color filter substrate, and filling liquid crystal molecules within the liquid crystal cell; and disposing a driver chip on a non-display region of the array substrate, and forming a protrusion on the array substrate in a first deformation region of the array substrate, wherein a depth of the notch is generally same as a height of the protrusion.

In the method of manufacturing the liquid crystal panel of the present invention, after the step of disposing an array planarizing layer on the array substrate, and forming a notch on the array planarizing layer in the first deformation region of the array substrate by using a pattern process, further comprising:

disposing a first alignment layer on the array planarizing layer of the display region of the array substrate.

In the method of manufacturing the liquid crystal panel of the present invention, after the step of disposing a color planarizing layer on the color filter substrate, further comprising:

disposing a second alignment layer on the color planarizing layer of the color filter substrate.

In the method of manufacturing the liquid crystal panel of the present invention, after the step of disposing an array planarizing layer on the array substrate, and forming a notch on the array planarizing layer in the first deformation region of the array substrate by using a pattern process, further comprising:

disposing the array planarizing layer on the array substrate; and patterning the array planarizing layer by using a halftone mask, so that the notch of the array planarizing layer is formed on the first deformation region of the array substrate.

In the method of manufacturing the liquid crystal panel of the present invention, the step of disposing an array planarizing layer on the array substrate, and forming a notch on the array planarizing layer in the first deformation region of the array substrate by using a pattern process further comprising:

disposing the first color planarizing layer on the array substrate by using a pattern process, wherein the first color planarizing layer of the array substrate is not disposed on the first array planarizing layer; and disposing the second color planarizing layer on the array substrate which is provided with the first array planarizing layer, so that the notch of the array planarizing layer is formed on the first deformation region of the array substrate.

In comparison with the conventional method of manufacturing a liquid crystal panel, the protrusion of the array substrate generating when bonding the driver chip is planarized by using the color planarizing layer of the color filter substrate and the array planarizing layer of the array substrate in the method of manufacturing the liquid crystal panel of the present invention, so as to prevent a liquid crystal cell from having non-uniform gaps and to solve the technical problem caused by a partial gaps of the liquid crystal cell becoming smaller thus leads to generate mura defects when bonding driver chips in the conventional method of manufacturing the liquid crystal panel.

In order to make the present invention more clear, preferred embodiments and the drawings thereof are described in detail below.

DETAILED DESCRIPTION OF THE INVENTION

The following embodiments refer to the accompanying drawings for exemplifying specific implementable embodiments of the present invention. Furthermore, directional terms described by the present invention, such as upper, lower, front, back, left, right, inner, outer, side, etc., are only directions by referring to the accompanying drawings, and thus the used directional terms are used to describe and understand the present invention, but the present invention is not limited thereto.

In the drawings, the same reference symbol represents the same or a similar component.

Figure 1:
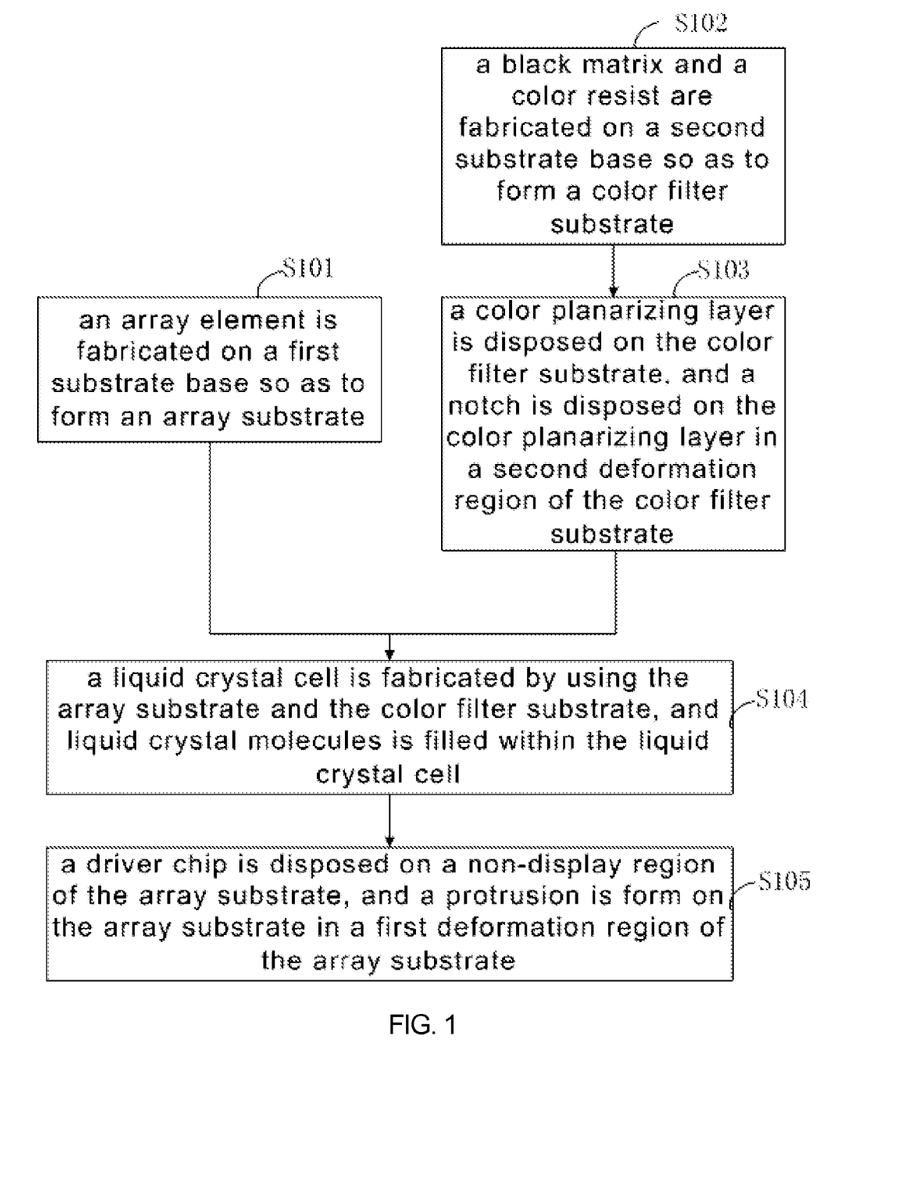
FIG. 1 is a flow chart of a method of manufacturing a liquid crystal panel of a first preferred embodiment of the present invention.
Figure 2:
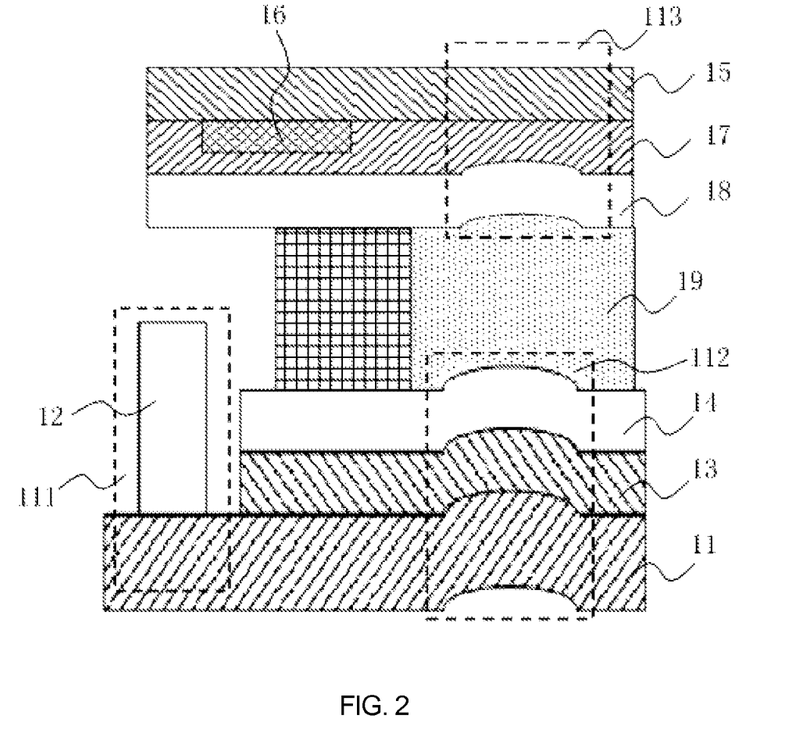
FIG. 2 is a schematic diagram showing a structure formed after the step S105 of the method of manufacturing the liquid crystal panel of the first preferred embodiment of the present invention.

Please refer to FIG. 1 and FIG. 2, FIG. 1 is a flow chart of a method of manufacturing a liquid crystal panel of a first preferred embodiment of the present invention, and FIG. 2 is a schematic diagram showing a structure formed after the step S105 of the method of manufacturing the liquid crystal panel of the first preferred embodiment of the present invention. In this preferred embodiment, the method of manufacturing the liquid crystal panel comprises:

In step S101, an array element is fabricated on a first substrate base so as to form an array substrate.

In step S102, a black matrix and a color resist are fabricated on a second substrate base so as to form a color filter substrate.

In step S103, a color planarizing layer is disposed on the color filter substrate, and a notch is disposed on the color planarizing layer in a second deformation region of the color filter substrate.

In step S104, a liquid crystal cell is fabricated by using the array substrate and the color filter substrate, and liquid crystal molecules is filled within the liquid crystal cell.

In step S105, a driver chip is disposed on a non-display region of the array substrate, and a protrusion is form on the array substrate in a first deformation region of the array substrate.

The specific processes of steps of the method of manufacturing the liquid crystal panel of this preferred embodiment are described in further detail below.

In the step S101, the array element is fabricated on the first substrate base. The array element may be a data line, a scan line, a thin film transistor, a pixel electrode, and so on. A plurality of metal layers and insulation layers are deposited on the first substrate base. The array element is fabricated on the first substrate base by many times of pattern processes, thereby forming the array substrate 11.

Preferably, an array planarizing layer 13 is further disposed on a display region of the array substrate 11, a first alignment layer 14 is disposed on the array planarizing layer 13 of the array substrate 11, thereby aligning the liquid crystal molecules of the liquid crystal layer at a pre-tilt angle and improving a response speed of the liquid crystal panel.

In the step S102, the black matrix and the color resist are fabricated on the second substrate base. A black matrix layer and a color resist layer are deposited on the second substrate base. The black matrix 16 and the color resist are fabricated on the second substrate base by many times of pattern processes, thereby forming the color filter substrate 15.

In the step S103, color planarizing layer 17 is disposed on the color filter substrate 15 configured by step S102. The notch is disposed on the color planarizing layer 17 in the second deformation region 113 of the color filter substrate 15. The depth of the notch of the color planarizing layer 17 is about 2 micrometers.

Preferably, a second alignment layer 18 is further disposed on the color planarizing layer 17 of the color filter substrate 15, thereby aligning the liquid crystal molecules of the liquid crystal layer at a pre-tilt angle and improving a response speed of the liquid crystal panel.

In the step S104, the array substrate 11 configured by step S101 and the color filter substrate 15 configured by step S103 are assembled, so as to fabricate the liquid crystal cell, and then liquid crystal molecules 19 are filled with in the liquid crystal cell.

In the step S105, the array substrate 11 comprises the display region for displaying image and comprises the non-display region 111 for disposing the other elements. The driver chip 12 is disposed on the non-display region 111 of the array substrate 11. That is, the driver chip 12 is bonding on the non-display region 111 of the array substrate 11. Thus, a protrusion on the first deformation region 112 is formed from the display region where near the driver chip 12 of the array substrate 11. The position of the first deformation region 112 of the array substrate 11 corresponds to the position of the second deformation region 113 of the color filter substrate 15. The depth of the notch is generally same as the height of the protrusion.

According to FIG. 2, the thickness of the liquid crystal cell corresponding to the position of the protrusion on the array substrate 11 is consistent with the thickness of the liquid crystal cell on the other region. Therefore, the protrusion on the array substrate 11 will not cause the liquid crystal cell having non-uniform gaps, and the generation of mura defects is prevented.

In this preferred embodiment, the method of manufacturing the liquid crystal panel is finished at step S105.

In the method of manufacturing the liquid crystal panel of this preferred embodiment, the notch on the color filter substrate corresponds to the protrusion on the array substrate, thereby preventing a bad effect caused by the protrusion of the array substrate.

Figure 3:
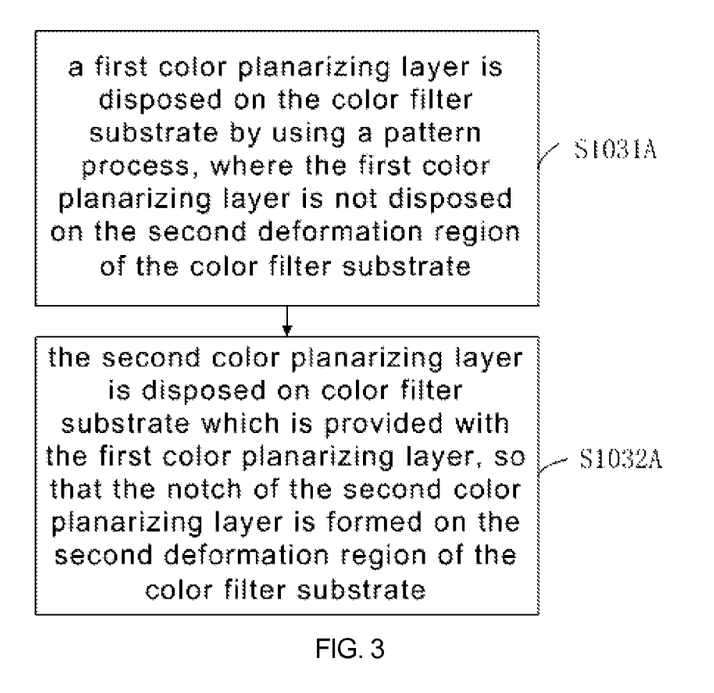
FIG. 3 is a first flow chart of the step S103 of the method of manufacturing the liquid crystal panel of the first preferred embodiment of the present invention.
Figure 4A:
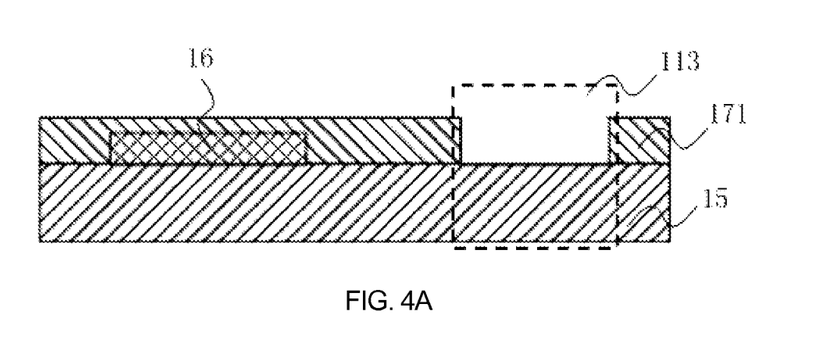
FIG. 4A is a structure schematic diagram showing a color filter substrate formed after the step S1031A of the method of manufacturing the liquid crystal panel of the first preferred embodiment of the present invention.

The process of disposing the color planarizing layer having the notch on the color filter substrate is described in detail below. Please refer to FIG. 3, which is a first flow chart of the step S103 of the method of manufacturing the liquid crystal panel of the first preferred embodiment of the present invention. The step S103 comprises:

In step S1031A, a first color planarizing layer 171 is disposed on the color filter substrate 15 by performing patterning using a mask, where the first color planarizing layer 171 is not disposed on the second deformation region 113 of the color filter substrate 15. Please refer to FIG. 4A, which is a structure schematic diagram showing the color filter substrate formed before the step S1032A of the method of manufacturing the liquid crystal panel of the first preferred embodiment of the present invention.

Figure 4B:
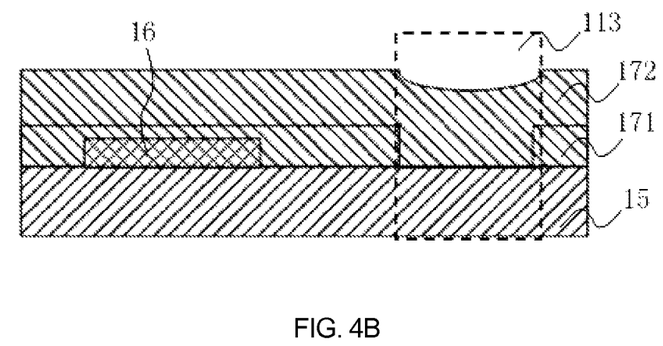
FIG. 4B is a structure schematic diagram showing the color filter substrate formed before the step S1032A of the method of manufacturing the liquid crystal panel of the first preferred embodiment of the present invention.

In step S1032A, second color planarizing layer 172 is disposed on color filter substrate 15 which is provided with the first color planarizing layer 171. In the step S1041A, since the first color planarizing layer 171 is not disposed on the second deformation region 113 of the color filter substrate 15, the notch of the second color planarizing layer 172 will be formed on the second deformation region 113 of the color filter substrate 15 while depositing the second color planarizing layer 172. The notch of the second color planarizing layer 172 is the notch of the color planarizing layer 17 in the step S103. Please refer to FIG. 4B, which is a structure schematic diagram showing the color filter substrate formed before the step S1032A of the method of manufacturing the liquid crystal panel of the first preferred embodiment of the present invention.

Figure 5:
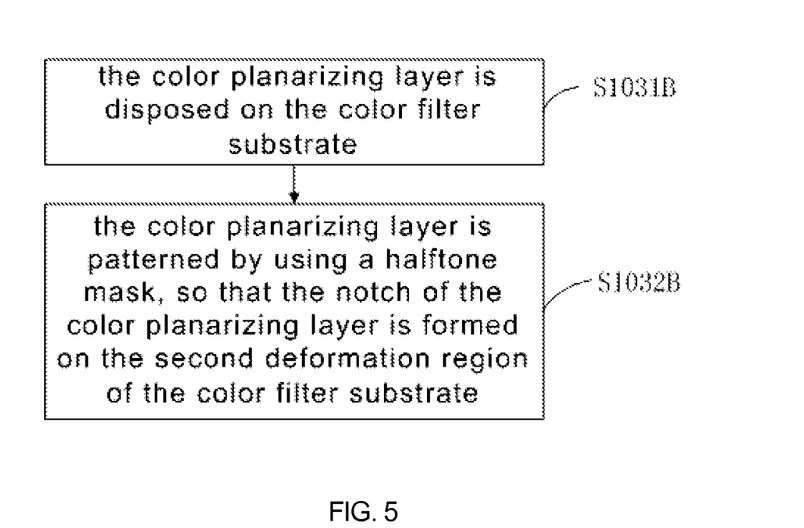
FIG. 5 is a second flow chart of the step S103 of the method of manufacturing the liquid crystal panel of the first preferred embodiment of the present invention.

Another process of disposing the color planarizing layer having the notch on the color filter substrate is described in detail below. Please refer to FIG. 5, which is a second flow chart of the step S103 of the method of manufacturing the liquid crystal panel of the first preferred embodiment of the present invention. The step S103 comprises:

In step S1031B, the color planarizing layer 17 is disposed on the color filter substrate 15.

Figure 6:
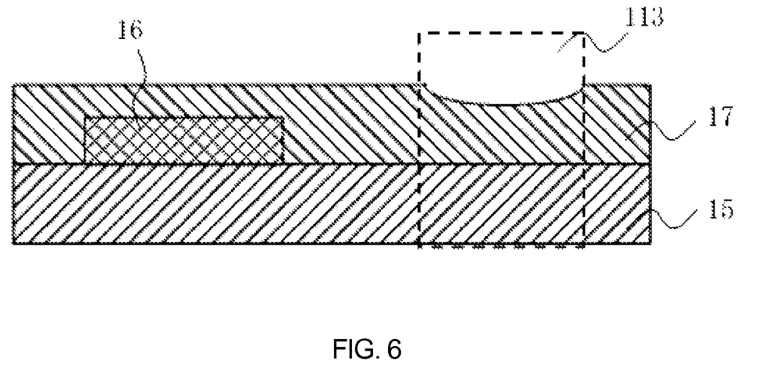
FIG. 6 is a structure schematic diagram showing the color filter substrate formed after the step S1032B of the method of manufacturing the liquid crystal panel of the first preferred embodiment of the present invention.

In step S1032B, the color planarizing layer 17 is patterned by using a halftone mask, so that the notch of the color planarizing layer 17 is formed on the second deformation region 113 of the color filter substrate 15. Please refer to FIG. 6, which is a structure schematic diagram showing the color filter substrate formed after the step S1032B of the method of manufacturing the liquid crystal panel of the first preferred embodiment of the present invention.

In the method of manufacturing the liquid crystal panel of this preferred embodiment, the protrusion of the array substrate generated by bonding the driver chip is planarized by utilizing the color planarizing layer of the color filter substrate, so as to prevent the liquid crystal cell from having non-uniform gaps.

Figure 7:
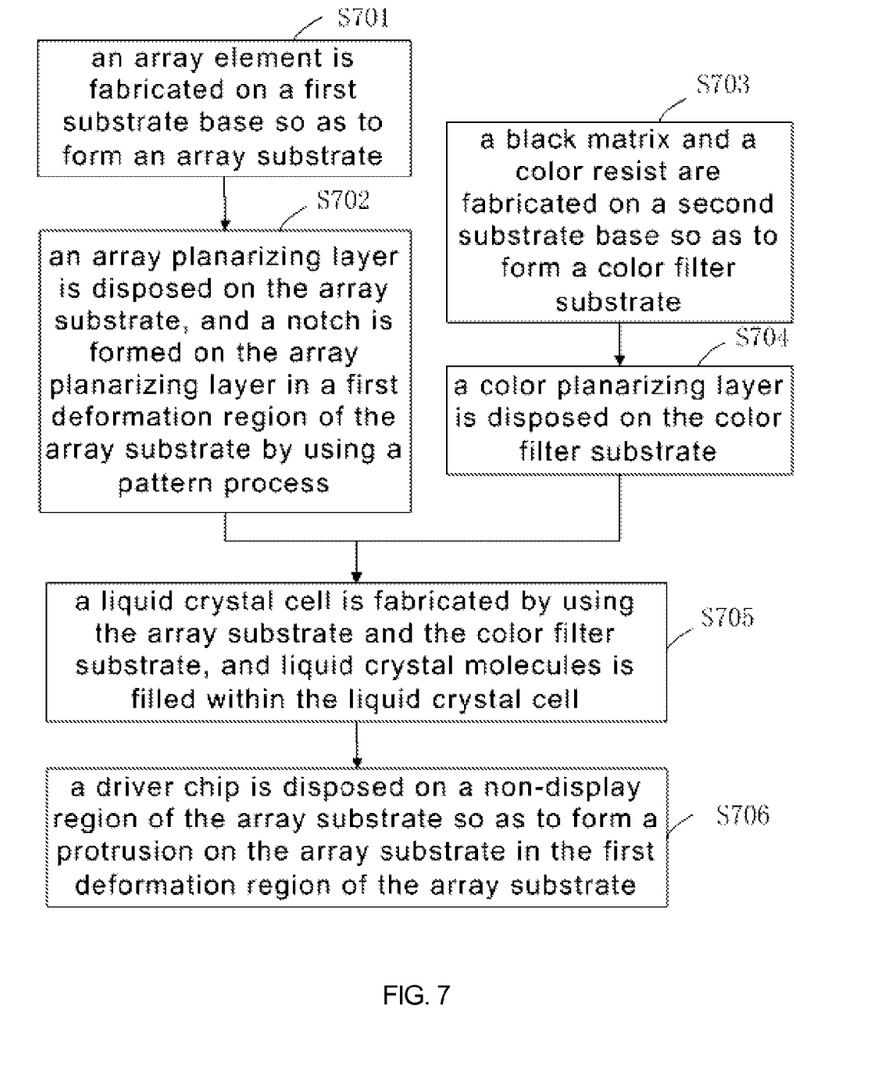
FIG. 7 is a flow chart of a method of manufacturing a liquid crystal panel of a second preferred embodiment of the present invention.
Figure 8:
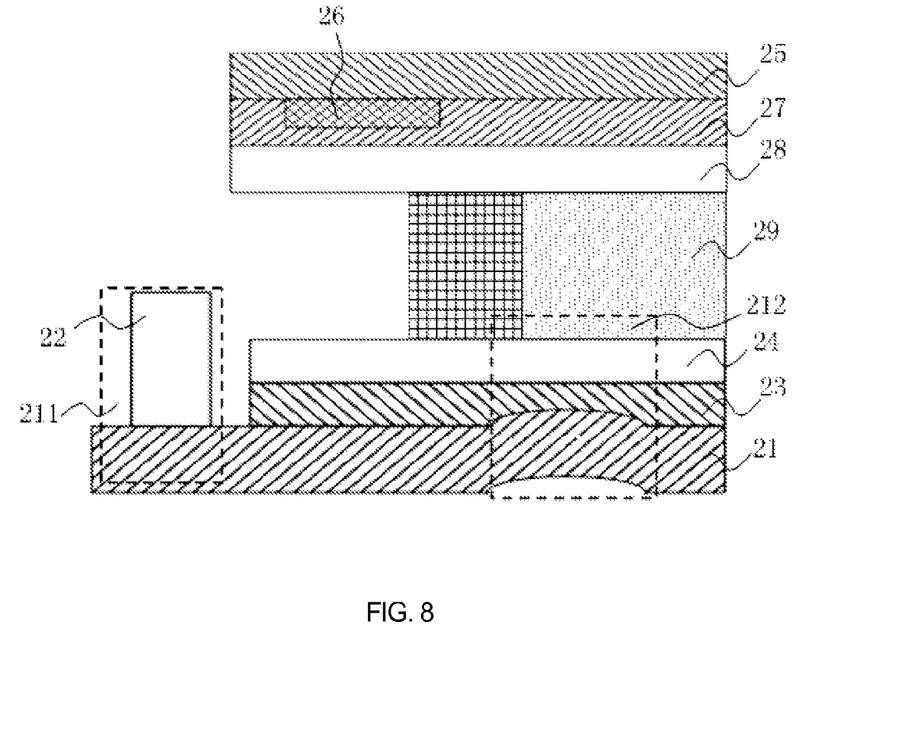
FIG. 8 is a schematic diagram showing a structure formed after the step S706 of the method of manufacturing the liquid crystal panel of the second preferred embodiment of the present invention.

Please refer to FIG. 7 and FIG. 8, FIG. 7 is a flow chart of a method of manufacturing a liquid crystal panel according to a second preferred embodiment of the present invention, and FIG. 8 is a schematic diagram showing a structure formed after the step S706 of the method of manufacturing the liquid crystal panel according to the second preferred embodiment of the present invention. In this preferred embodiment, the method of manufacturing the liquid crystal panel comprises:

In step S701, an array element is fabricated on a first substrate base so as to form an array substrate.

In step S702, an array planarizing layer is disposed on the array substrate, and a notch is formed on the array planarizing layer in a first deformation region of the array substrate by using a pattern process.

In step S703, a black matrix and a color resist are fabricated on a second substrate base so as to form a color filter substrate.

In step S704, a color planarizing layer is disposed on the color filter substrate.

In step S705, a liquid crystal cell is fabricated by using the array substrate and the color filter substrate, and liquid crystal molecules is filled within the liquid crystal cell.

In step S706, a driver chip is disposed on a non-display region of the array substrate so as to form a protrusion on the array substrate in the first deformation region of the array substrate. The depth of the notch is generally same as the height of the protrusion.

The specific processes of steps of the method of manufacturing the liquid crystal panel of this preferred embodiment are described in further detail below.

In the step S701, the array element is fabricated on the first substrate base. The array element may be a data line, a scan line, a thin film transistor, a pixel electrode, and so on. A plurality of metal layers and insulation layers are deposited on the first substrate base. The array element is fabricated on the first substrate base by many times of pattern processes, thereby forming the array substrate 21.

In the step S702, the array planarizing layer 23 is disposed on the array substrate 21, and the notch is formed on the array planarizing layer 23 in the first deformation region 212 of the array substrate 21 by using the pattern process.

Preferably, a first alignment layer 24 is disposed on the array planarizing layer 23 of the array substrate 21, thereby aligning the liquid crystal molecules of the liquid crystal layer at a pre-tilt angle and improving the respond speed of the liquid crystal panel.

In the step S703, the black matrix and the color resist are fabricated on the second substrate base. The black matrix and the color resist are deposited on the second substrate base, and the black matrix 26 and the color resist (not shown on Figs.) are fabricated on the second substrate base by many times of pattern processes, thereby forming the color filter substrate 25.

In the step S704, the color planarizing layer 27 is disposed on the color filter substrate 25 configured by step S102.

Preferably, a second alignment layer 28 is further disposed on the color planarizing layer 27 of the color filter substrate 25, thereby aligning the liquid crystal molecules of the liquid crystal layer at the pre-tilt angle and improving the respond speed of the liquid crystal panel.

In the step S705, the array substrate 21 configured by step S702 and the color filter substrate 25 configured by step S704 are assembled, so as to fabricate the liquid crystal cell, and then liquid crystal molecules 29 are filled with in the liquid crystal cell.

In the step S706, the array substrate 21 comprises the display region for displaying image and comprises the non-display region 211 for disposing the other elements. The driver chip 22 is disposed on the non-display region 211 of the array substrate 21. That is, the driver chip 22 is bonding on the non-display region 211 of the array substrate 21. Thus, a protrusion is formed on the first deformation region 212 in the display region where near the driver chip 22 of the array substrate 21. The height of the protrusion is generally same as the depth of the notch of the array planarizing layer 23 configured by step S702.

According to FIG. 8, the thickness of the liquid crystal cell corresponding to the position of the protrusion on the array substrate 21 is consistent with the thickness of the liquid crystal cell on the other region. Therefore, the protrusion on the array substrate 21 will not cause the liquid crystal cell having non-uniform gaps, and the generation of mura defects is prevented.

In this preferred embodiment, the method of manufacturing the liquid crystal panel is finished at step S706.

In the method of manufacturing the liquid crystal panel of this preferred embodiment, the array planarizing layer is disposed on the array substrate for planarizing the protrusion of the array substrate, thereby preventing a bad effect caused by the protrusion of the array substrate.

Figure 9:
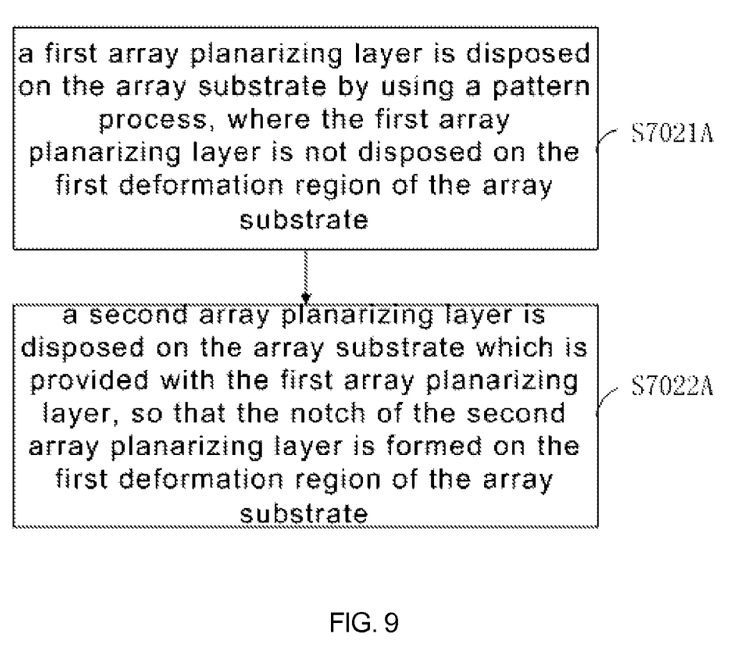
FIG. 9 is a first flow chart of the step S702 of the method of manufacturing the liquid crystal panel of the second preferred embodiment of the present invention.
Figure 10A:
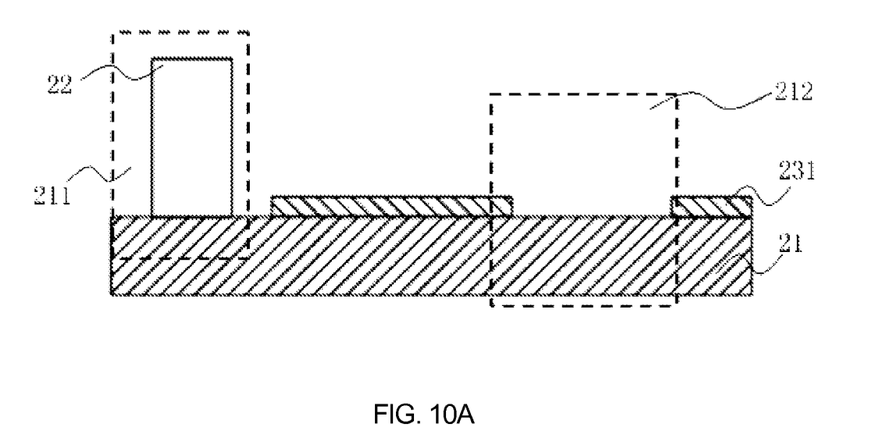
FIG. 10A is a structure schematic diagram showing a color filter substrate formed after the step S7021A of the method of manufacturing the liquid crystal panel of the second preferred embodiment of the present invention.

The process of disposing the array planarizing layer on the array substrate is described in detail below. Please refer to FIG. 9, which is a first flow chart of the step S702 of the method of manufacturing the liquid crystal panel of the second preferred embodiment of the present invention. The step S702 comprises:

In step S7021A, a first array planarizing layer 231 is disposed on the array substrate 21 by performing patterning using a mask, where the first array planarizing layer 231 is not disposed on the first deformation region 212 of the array substrate 21. Please refer to FIG. 10A, which is a structure schematic diagram showing the array substrate formed before the step S7021A of the method of manufacturing the liquid crystal panel of the second preferred embodiment of the present invention.

Figure 10B:
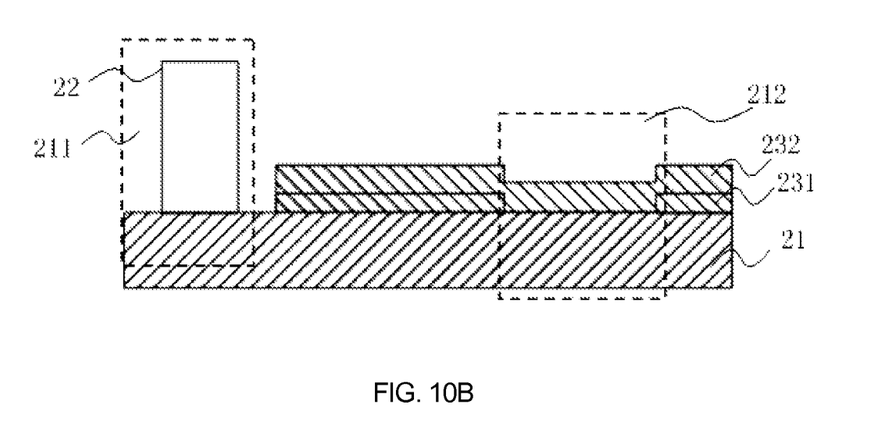
FIG. 10B is a structure schematic diagram showing the color filter substrate formed before the step S7022A of the method of manufacturing the liquid crystal panel of the second preferred embodiment of the present invention.

In step S7022A, second array planarizing layer 232 is disposed on the array substrate 21 which is provided with the first array planarizing layer 231. In the step S7021A, since the first array planarizing layer 231 is not disposed on the first deformation region 212 of the array substrate 21, the notch of the second array planarizing layer 232 will be formed on the first deformation region 212 of the array substrate 21 while depositing the second array planarizing layer 232. The notch of the s second array planarizing layer 232 is the notch of the array planarizing layer 23 in the step S702. Please refer to FIG. 10B, which is a structure schematic diagram showing the array substrate formed before the step S7022A of the method of manufacturing the liquid crystal panel of the second preferred embodiment of the present invention.

Figure 11:
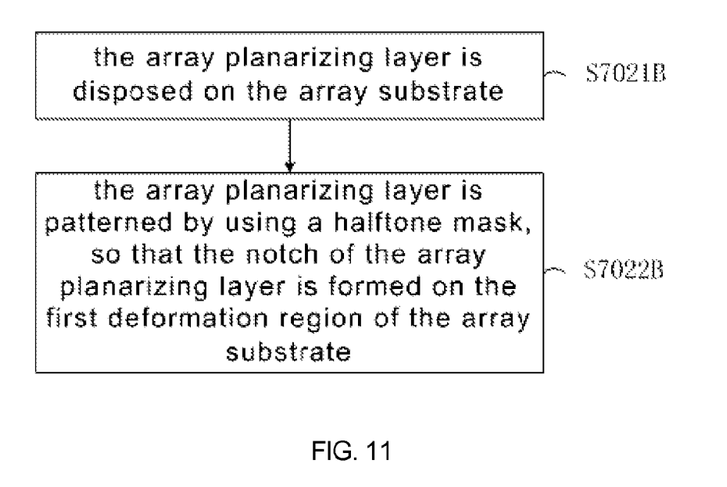
FIG. 11 is a second flow chart of the step S702 of the method of manufacturing the liquid crystal panel of the second preferred embodiment of the present invention.

Another process of disposing the array planarizing layer on the array substrate is described in detail below. Please refer to FIG. 11, which is a second flow chart of the step S702 of the method of manufacturing the liquid crystal panel of the second preferred embodiment of the present invention. The step S702 comprises:

In step S7021B, the array planarizing layer 23 is disposed on the array substrate 21.

Figure 12:
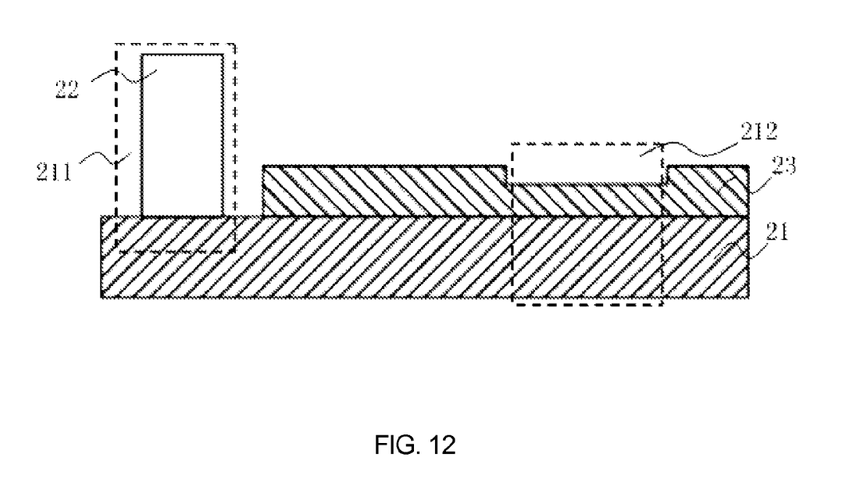
FIG. 12 is a structure schematic diagram showing the color filter substrate formed after the step S7022B of the method of manufacturing the liquid crystal panel of the second preferred embodiment of the present invention.

In step S7022B, the array planarizing layer 23 is patterned by using a halftone mask, so that the notch of the array planarizing layer 23 is formed on the first deformation region 212 of the array substrate 21. Please refer to FIG. 12, which is a structure schematic diagram showing the array substrate formed after the step S7022B of the method of manufacturing the liquid crystal panel of the second preferred embodiment of the present invention.

In the method of manufacturing the liquid crystal panel of this preferred embodiment, the protrusion of the array substrate generated by bonding the driver chip is planarized by utilizing the array planarizing layer of the array substrate, so as to prevent the liquid crystal cell from having non-uniform gaps.

In the method of manufacturing the liquid crystal panel of the present invention, the protrusion of the array substrate generating when bonding the driver chip is planarized by using the color planarizing layer of the color filter substrate and the array planarizing layer of the array substrate, so as to prevent a liquid crystal cell from having non-uniform gaps and to solve the technical problem caused by a partial gaps of the liquid crystal cell becoming smaller thus leads to generate mura defects when bonding driver chips in the conventional method of manufacturing the liquid crystal panel.

The above descriptions are merely preferable embodiments of the present invention, but are not intended to limit the scope of the present invention. Any modification or replacement made by those skilled in the art without departing from the spirit and principle of the present invention should fall within the protection scope of the present invention. Therefore, the protection scope of the present invention is subject to the appended claims.

What is claimed is:

1. A method for manufacturing a liquid crystal panel, comprising:
    fabricating an array element on a first substrate base to form an array substrate;
    disposing a first alignment layer on a display region of the array substrate;
    fabricating a black matrix and a color resist on the second substrate base to form a color filter substrate;
    disposing a color planarizing layer on the color filter substrate, and disposing a notch on the color planarizing layer in a second deformation region of the color filter substrate;
    disposing a second alignment layer on the color planarizing layer of the color filter substrate;
    fabricating a liquid crystal cell by using the array substrate and the color filter substrate, and filling liquid crystal molecules within the liquid crystal cell; and
    disposing a driver chip on a non-display region of the array substrate, and forming a protrusion on the array substrate in a first deformation region of the array substrate, wherein a position of the first deformation region of the array substrate corresponds to a position of the second deformation region of the color filter substrate; and a depth of the notch is generally same as a height of the protrusion.

2. The method of manufacturing the liquid crystal panel according to claim 1, after the step of fabricating an array element on a first substrate base to form an array substrate, further comprising:
    disposing an array planarizing layer on the array substrate; and
    disposing the first alignment layer on the array planarizing layer of the display region of the array substrate.

3. The method of manufacturing the liquid crystal panel according to claim 1, the step of disposing a color planarizing layer on the color filter substrate, and disposing a notch on the color planarizing layer in a second deformation region of the color filter substrate further comprising:
    disposing the color planarizing layer on the color filter substrate;
    patterning the color planarizing layer by using a halftone mask, so that the notch of the color planarizing layer is formed on the second deformation region of the color filter substrate.

4. The method of manufacturing the liquid crystal panel according to claim 1, the step of disposing a color planarizing layer on the color filter substrate, and disposing a notch on the color planarizing layer in a second deformation region of the color filter substrate further comprising:
disposing the first color planarizing layer on the color filter substrate by using a pattern process, wherein the first color planarizing layer is not disposed on the second deformation region of the color filter substrate; and
disposing the second color planarizing layer on the color filter substrate which is provided with the first color planarizing layer, so that the notch of the second color planarizing layer is formed on the second deformation region of the color filter substrate.

5. A method for manufacturing a liquid crystal panel, comprising:
fabricating an array element on a first substrate base to form an array substrate;
fabricating a black matrix and a color resist on the second substrate base to form a color filter substrate;
disposing a color planarizing layer on the color filter substrate, and disposing a notch on the color planarizing layer in a second deformation region of the color filter substrate;
fabricating a liquid crystal cell by using the array substrate and the color filter substrate, and filling liquid crystal molecules within the liquid crystal cell; and
disposing a driver chip on a non-display region of the array substrate, and forming a protrusion on the array substrate in a first deformation region of the array substrate, wherein a position of the first deformation region of the array substrate corresponds to a position of the second deformation region of the color filter substrate; and a depth of the notch is generally same as a height of the protrusion.

6. The method of manufacturing the liquid crystal panel according to claim 5, after the step of fabricating an array element on a first substrate base to form an array substrate, further comprising: disposing a first alignment layer on a display region of the array substrate.

7. The method of manufacturing the liquid crystal panel according to claim 6, after the step of forming an array element on a first substrate base to form an array substrate, further comprising:
disposing an array planarizing layer on the array substrate; and
disposing the first alignment layer on the array planarizing layer of the display region of the array substrate.

8. The method of manufacturing the liquid crystal panel according to claim 5, after the step of disposing a color planarizing layer on the color filter substrate, and disposing a notch on the color planarizing layer in a second deformation region of the color filter substrate, further comprising: disposing a second alignment layer on the color planarizing layer of the color filter substrate.

9. The method of manufacturing the liquid crystal panel according to claim 5, the step of disposing a color planarizing layer on the color filter substrate, and disposing a notch on the color planarizing layer in a second deformation region of the color filter substrate further comprising:
disposing the color planarizing layer on the color filter substrate;
patterning the color planarizing layer by using a halftone mask, so that the notch of the color planarizing layer is formed on the second deformation region of the color filter substrate.

10. The method of manufacturing the liquid crystal panel according to claim 5, the step of disposing a color planarizing layer on the color filter substrate, and disposing a notch on the color planarizing layer in a second deformation region of the color filter substrate further comprising:
disposing the first color planarizing layer on the color filter substrate by using a pattern process, wherein the first color planarizing layer is not disposed on the second deformation region of the color filter substrate; and
disposing the second color planarizing layer on the color filter substrate which is provided with the first color planarizing layer, so that the notch of the second color planarizing layer is formed on the second deformation region of the color filter substrate.

11. A method for manufacturing a liquid crystal panel, comprising:
fabricating an display element on a first substrate base to form an array substrate;
disposing an array planarizing layer on the array substrate, and forming a notch on the array planarizing layer in the first deformation region of the array substrate by using a pattern process;
fabricating a black matrix and a color resist on the second substrate base to form a color filter substrate;
disposing a color planarizing layer on the color filter substrate;
fabricating a liquid crystal cell by using the array substrate and the color filter substrate, and filling liquid crystal molecules within the liquid crystal cell; and
disposing a driver chip on a non-display region of the array substrate, and forming a protrusion on the array substrate in a first deformation region of the array substrate, wherein a depth of the notch is generally same as a height of the protrusion.

12. The method of manufacturing the liquid crystal panel according to claim 11, after the step of disposing an array planarizing layer of the array substrate, and forming a notch on the array planarizing layer in the first deformation region of the array substrate by using a pattern process, further comprising: disposing a first alignment layer on the array planarizing layer of the display region of the array substrate.

13. The method of manufacturing the liquid crystal panel according to claim 11, after the step of disposing a color planarizing layer on the color filter substrate, further comprising: disposing a second alignment layer on the color planarizing layer of the color filter substrate.

14. The method of manufacturing the liquid crystal panel according to claim 11, after the step of disposing an array planarizing layer on the array substrate, and forming a notch on the array planarizing layer in the first deformation region of the array substrate by using a pattern process, further comprising:
disposing the array planarizing layer on the array substrate; and
patterning the array planarizing layer by using a halftone mask, so that the notch of the array planarizing layer is formed on the first deformation region of the array substrate.

15. The method of manufacturing the liquid crystal panel according to claim 11, the step of disposing an array planarizing layer on the array substrate, and forming a notch on the array planarizing layer in the first deformation region of the array substrate by using a pattern process further comprising:
disposing the first color planarizing layer on the array substrate by using a pattern process, wherein the first color planarizing layer of the array substrate is not disposed on the first array planarizing layer; and disposing the second color planarizing layer on the array substrate which is provided with the first array planarizing layer, so that the notch of the array planarizing layer is formed on the first deformation region on the array substrate.

* * * * *